United States Patent [19]

DeSalve

[11] Patent Number: 4,632,360
[45] Date of Patent: Dec. 30, 1986

[54] BUTTERFLY TYPE VALVE SEAL

[75] Inventor: Dennis W. DeSalve, Findlay, Ohio

[73] Assignee: United Aircraft Products, Inc., Dayton, Ohio

[21] Appl. No.: 292,997

[22] Filed: Aug. 14, 1981

[51] Int. Cl.$^4$ ............................................. F16K 25/00
[52] U.S. Cl. ..................................... 251/175; 251/173; 251/180; 251/307
[58] Field of Search ................ 251/173, 175, 180, 307

[56] References Cited

U.S. PATENT DOCUMENTS

| 1,860,619 | 5/1932 | Pfau | 251/175 |
| 2,965,354 | 12/1960 | Grove | 251/173 |
| 3,027,133 | 3/1962 | Anderson | 251/173 |
| 3,282,558 | 11/1966 | Swain | 251/173 X |
| 3,642,248 | 2/1972 | Benware | 251/175 |
| 3,726,503 | 4/1973 | Fawkes | 251/173 |
| 3,734,457 | 5/1973 | Roos | 251/173 |
| 4,290,615 | 9/1981 | Etcheverry | 251/307 |

FOREIGN PATENT DOCUMENTS 660463   4/1963   Canada ............................... 251/307

Primary Examiner—Harold W. Weakley
Attorney, Agent, or Firm—J. E. Beringer

[57] ABSTRACT

A pivotally adjustable valve disc has a ring seal set in its grooved periphery for contact with a wall of a valve accomodating bore. A flexible, radially expansible member is in the valve groove in a backing relation to the ring seal. Passages admit pressure fluid from the upstream side of the valve disc to the valve groove where the applied pressure is exerted through the radially expansible member toward a radial expansion of the ring seal. In its pressured contact with the seal, the radially expansible member blocks pressure fluid escape through gaps and interfacial joints therein.

4 Claims, 7 Drawing Figures

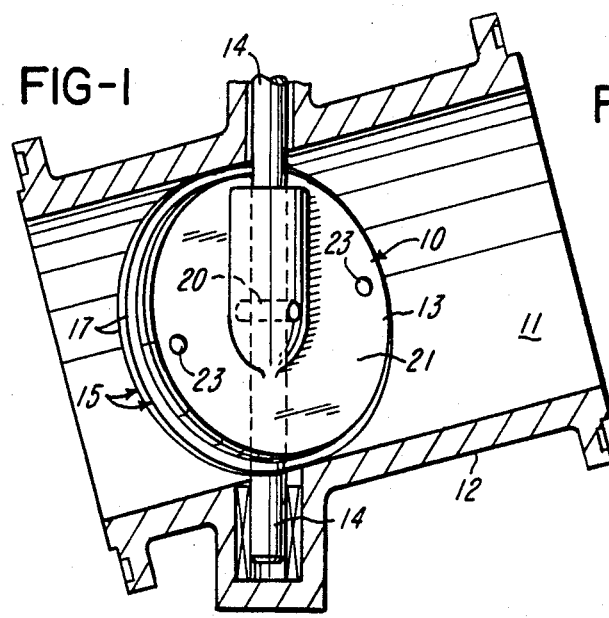
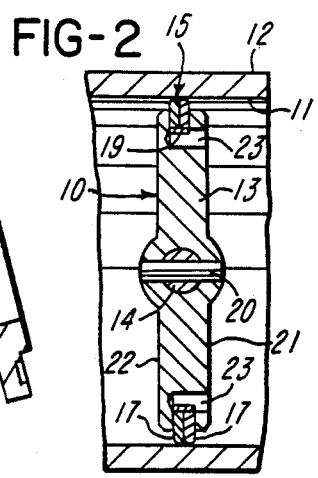
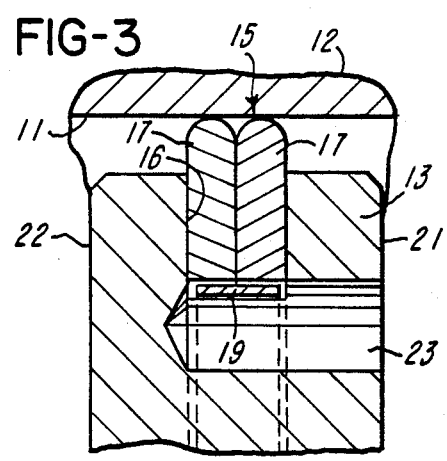
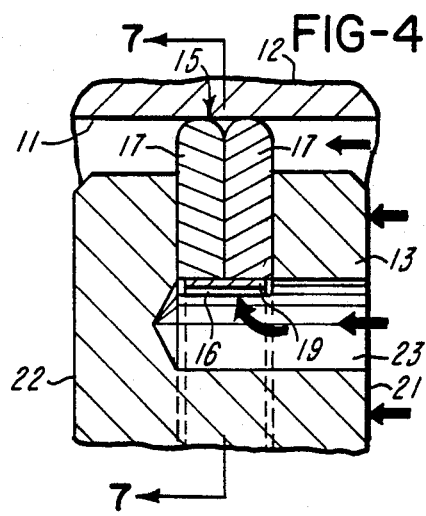
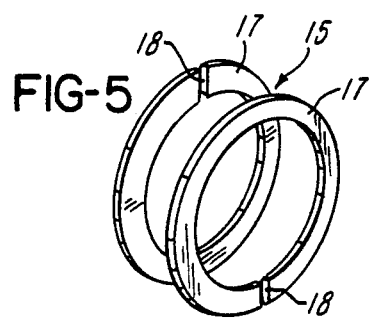
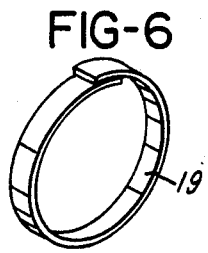
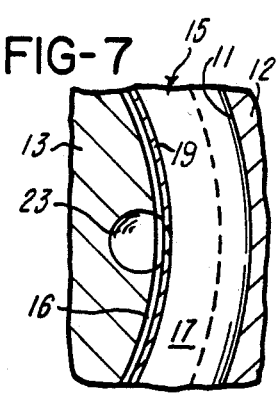

BUTTERFLY TYPE VALVE SEAL

BACKGROUND OF THE INVENTION

1. Field of the Invention

This invention relates to butterfly type valves, and particularly to installed peripheral seals therein.

2. Description of the Prior Art.

Butterfly type valves for use in controlling the flow of high temperature fluids make use of metallic piston type split ring seals recessed into a groove in the valve periphery. A seal assembly as installed in a valve groove may comprise two or more split rings in a face to face relation substantially filling the groove between what may be regarded as front and back edges thereof. An outer periphery of the seal assembly projects from the groove for a sealing engagement with a valve accommodating bore wall. An inner periphery terminates within the groove.

The valve construction of the prior art has certain inherent leak paths including that between the seal outer periphery and the bore wall where surface irregularities may exist. Also, upstream fluid pressure can reach the groove interior, as a consequence of the seal assembly being displaced against the back wall of the groove, and from there migrate through ring gaps and between ring interfaces to the downstream side of the valve.

In the prior art, in dealing with the leakage problem, any one of a variety of techniques has been adopted, or combinations thereof. According to one thereof, the natural tendency of the ring or rings to expand is enhanced so that the seal pushes tightly against the bore wall. This has the disadvantage of promoting excessive valve wear, and does nothing to deal with the problem of leakage between ring interfaces. The number of seal rings can be increased but this adds to cost, and, again, does not deal with interfacial leakage. Another common, but costly, recourse is critical machining to insure precise fits, very fine surface finishes and close tolerances. Frequently, and despite practice of the best prior art techniques, the amount of fluid leakage cannot be reduced to values a given application may require, making use of a butterfly type valve in that application impractical.

SUMMARY OF THE INVENTION

The instant invention provides a seal for a butterfly type valve obviating many of the prior art problems and extending the field of use of such a valve.

In accordance with the invention, in a plural ring seal as known in the prior art, passages are drilled or otherwise formed in the upstream face of the valve leading to the interior of the peripheral valve groove. Further, there is introduced into the valve groove, in a backing relation to the seal assembly therein a flexible strip having overlapping ends so as to be radially expansible under applied fluid pressure. Upstream fluid pressure is admitted to the valve groove by way of the drilled passages. There it acts with radially expansive force upon the introduced backing strip urging it into intimately contacting relation with the inner periphery of the seal assembly. The effect is two-fold in that the strip seals off gaps and joints in the seal assembly itself and in that the fluid pressure is applied to the seal assembly urging it outward into close fitting contact with the bore wall. A very high degree of resistance to leakage past a closed valve accordingly is insured. Also, valve reliability is improved and manufacturing cost reduced. The built-in radial force of the seal rings, that is, the inherent expansion capability of the rings unaided by fluid pressure, can be substantially reduced. This lowers normal surface stress at the point of interengagement of the seal with the bore wall resulting in extended part life. Additionally, tolerances and finishes can be relaxed with consequent economic advantages.

An object of the invention is to provide a butterfly type valve seal substantially as set out in the foregoing.

Other objects and structural details of the invention will more clearly appear from the following description, when read in conjunction with the accompanying drawings, wherein:

FIG. 1 is a view in perspective of a butterfly valve in accordance with the present invention, shown mounted in a valve housing, in an open position;

FIG. 2 is a fragmentary view in longitudinal section of the structure of FIG. 1, the valve being shown in a closed position;

FIG. 3 is a view of a portion of FIG. 2 and relatively enlarged, showing parts as they appear in the absence of applied fluid pressure, the relationship of parts being somewhat exaggerated for illustrative purposes;

FIG. 4 is a view like FIG. 3, showing the parts as they appear in the presence of applied fluid pressure;

FIG. 5 is a detailed view in perspective of a ring seal;

FIG. 6 is a detailed view in perspective of an expansion member comprised in the seal apparatus; and FIG. 7 is a fragmentary view in cross section, taken substantially along the line 7—7 of FIG. 4.

In accordance with the illustrated embodiment of the invention, a butterfly valve positions in bore 11 of a housing 12 to control a flow therethrough of fluid under pressure. The valve 10 has a disc-like body 13 transversely enlarged toward its midportion to accommodate a canted mounting shaft 14, the latter having end bearings in the housing 12. A pin 20 fixes the valve body to the shaft 14. The shaft 14 adjusts the valve 10 to various positions between fully opened and fully closed, in which latter position the disc-like body 13 occupies a plane perpendicular to the longitudinal axis of bore 11. In a closed position of the valve, the outer periphery of body 13 occupies a position in an approaching relation to the wall of bore 11, in which position a seal means 15 projecting from the valve periphery is adapted to make sealing contact with the bore wall.

The valve periphery has a continuous, circumferential groove 16 therein receiving the seal means 15. From what may be regarded as front to back edges thereof, the groove 16 is substantially filled by the seal means 15 which is, however, in a radially projecting relation to the plane of such edges, which plane defines the valve periphery.

The seal means 15 is comprised of a pair of piston type seal rings 17, made of metal in accordance with high temperature operational requirements of the valve. Each ring 17 includes a gap 18 in its circular configuration and has a resilient construction in that if moved to close the gap 18 the ring will attempt to expand or to return to a normal position. The rings are in a face to face contacting relation to one another and are so respectively oriented in a circumferential sense that the gaps 18 are approximately 180° distant from one another. The seal rings snap in place in the groove 16 in the manner of conventional piston rings and occupy a position in the groove in which inner ring peripheries space radially outwardly of the bottom of the groove.

Introduced into the groove 16 in advance of installation of the ring seals 17, and in a position to lie in a backing relation to the ring seals, is an expansion member 19. The latter is a strip of flexible, metallic material having a width approaching the total thickness of the seal means 15 and having a length so that when bent to a circular configuration to be accommodated in the groove 16, ends of the strip overlap one another. The valve body 13 has upstream and downstream faces 21 and 22, respectively, having regard to the direction of flow of fluid through the bore 11. The upstream face 21 is drilled at spaced locations to provide a pair of recesses 23, inner ends of which intersect or open into the groove 16. Due to the presence of recesses 23, relatively high fluid pressure values which prevail upstream of the valve 10 are exhibited also interiorily of groove 16, within expansion member 19. Within the groove, the applied fluid pressure is exerted in a manner to expand member 19 radially outward into contact with the inner periphery of the ring seals 17. Under the thrust of applied pressure, therefore, member 19 has a dual function. Firstly, it intimately contacts the valve seal inner periphery and closes gaps and interface joints therein. Secondly, it transmits substantially the whole of the applied fluid pressure to the ring seals in a manner to effect their expansion outward into close fitting contact with the wall of bore 11. The net result is a utilization of fluid pressure to create effective seals against an escape of pressure fluid both aroung the valve seal periphery and through gaps and joints in the valve seal assembly. Valve life and reliability also are improved since the built-in or normal expansion force which the ring seals have in the absence of fluid pressure can be reduced. This means easier operation, and less wear. The tolerance to which parts are made, and the need for very fine surface finishes, can be relaxed with obvious manufacturing and economic benefits.

FIGS. 3 and 4 provide a comparison of how parts appear in the absence of and in the presence of applied fluid pressure. Some liberty of exaggeration has been taken for illustration purposes.

A seal assembly comprised of a pair of seal rings is shown in the invention embodiment. Clearly, like principles would apply in the event of use of a seal comprised of a single ring or of a number larger than two.

The invention has been disclosed with respect to one illustrated embodiment, and certain modifications in such embodiment have been discussed. It will be understood that these and other modifications within the scope of persons skilled in the art are within the intent and comprehension of the invention.

What is claimed is:

1. A butterfly type valve element in disc form controlling flow of a fluid through a valve accomodating bore, said valve element having a peripheral groove, plural split ring seals in a face to face relation installed independently of one another in said groove to substantially fill said groove in a longitudinal sense, inner peripheries of said seals being spaced radially outwardly from the bottom of said groove, means for admitting pressure fluid to said groove at a location radially inwardly of the inner peripheries of said seals, and means in said groove radially inwardly of the inner peripheries of said seals and overlying the joint or joints between said seals utilizing the pressure of admitted pressure fluid in said groove to apply a radially expanding pressure substantially uniformly to said ring seals and without a loss of fluid pressure through said joint or joints.

2. A butterfly type valve element according to claim 1, said pressure utilizing means being a flexible strip of material which in bent circular form is installed in said groove to occupy a position therein in backing relation to the inner peripheries of said ring seals, said flexible strip in its circular form having a length to overlie the joint or joints between plural ring seals and as confined in said grove by said ring seals being expansible therein and having ends that overlap one another.

3. A butterfly type valve element according to claim 2, said valve element having an upstream face and a downstream face having regard to its position in said bore, said fluid admitting means having the form of passage means opening through the upstream face of the valve element and communicating with said groove.

4. A butterfly type valve element according to claim 3, said ring seals being made of metal and said flexible strip of material being made of metal and having a flat sheet-like form.

* * * * *